(12) United States Patent
Sklovsky et al.

(10) Patent No.: US 10,311,427 B2
(45) Date of Patent: Jun. 4, 2019

(54) METHOD AND SYSTEM FOR MONITORING SECURE APPLICATION EXECUTION EVENTS DURING CONTACTLESS RFID/NFC COMMUNICATION

(75) Inventors: Vladimir Sklovsky, Vernon Hills, IL (US); Ruben R. Formoso, Weston, FL (US); Lyle A. Gaastra, Hainesville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2593 days.

(21) Appl. No.: 11/618,135

(22) Filed: Dec. 29, 2006

(65) Prior Publication Data

US 2008/0162361 A1 Jul. 3, 2008

(51) Int. Cl.
*G06Q 20/00* (2012.01)
*G06Q 20/32* (2012.01)
*G06Q 20/36* (2012.01)
*G06Q 20/38* (2012.01)
*G06Q 20/40* (2012.01)

(52) U.S. Cl.
CPC ........... *G06Q 20/327* (2013.01); *G06Q 20/32* (2013.01); *G06Q 20/3278* (2013.01); *G06Q 20/367* (2013.01); *G06Q 20/382* (2013.01); *G06Q 20/40* (2013.01)

(58) Field of Classification Search
CPC ................................................. G06Q 20/3278
USPC ................................. 705/65; 455/41.1, 41.2
See application file for complete search history.

(56) References Cited

U.S. PATENT DOCUMENTS

| | | | | |
|---|---|---|---|---|
| 5,758,190 A | * | 5/1998 | Johnson et al. | ................. 710/48 |
| 5,761,492 A | * | 6/1998 | Fernando et al. | ............ 712/244 |
| 5,923,884 A | * | 7/1999 | Peyret | ................. G06Q 20/341 |
| | | | | 235/382 |
| 6,004,276 A | * | 12/1999 | Wright et al. | ................ 600/508 |

(Continued)

FOREIGN PATENT DOCUMENTS

| | | |
|---|---|---|
| EP | 1503352 A | 2/2005 |
| GB | 2367935 | 4/2002 |

(Continued)

OTHER PUBLICATIONS

White et. al. "How Computers Work", Oct. 2003, Que, 7$^{th}$ Edition.*

(Continued)

*Primary Examiner* — Steven S Kim
(74) *Attorney, Agent, or Firm* — Fish & Richardson P.C.

(57) ABSTRACT

A system (211) and method (300) for reliable monitoring of secure application execution events is provided. The system can include a Near Field Communication (NFC) modem (140) for communicating transaction events of a secure contactless transaction (358) with a NFC reader (170), a secure controller (200) for monitoring state transitions caused by the transaction events, and a mobile host communicatively coupled to the secure controller for receiving hardware event notifications of the state transitions. The secure controller can generate message using a hardware interrupt to a mobile host based on secure applet state transition monitoring by setting up the events flag such as a Transaction Completion Flag (TCF) (372) into an Events Status Register (232) to identify a status of a secure contactless transactions.

7 Claims, 4 Drawing Sheets

(56) References Cited

U.S. PATENT DOCUMENTS

| | | | | |
|---|---|---|---|---|
| 6,076,075 | A * | 6/2000 | Teicher | G06Q 20/10 235/375 |
| 6,145,009 | A * | 11/2000 | Miyazawa et al. | 709/236 |
| 6,263,396 | B1 * | 7/2001 | Cottle et al. | 710/263 |
| 6,477,559 | B1 * | 11/2002 | Veluvali et al. | 718/101 |
| 6,532,023 | B1 * | 3/2003 | Schumacher et al. | 715/704 |
| 6,591,375 | B1 * | 7/2003 | Hu | 714/25 |
| 6,751,753 | B2 * | 6/2004 | Nguyen et al. | 714/39 |
| 6,950,939 | B2 * | 9/2005 | Tobin | G06Q 20/02 713/168 |
| 6,970,167 | B1 | 11/2005 | Kumamoto et al. | 345/440 |
| 7,184,706 | B2 * | 2/2007 | Someya | G06K 7/0008 455/41.2 |
| 7,320,126 | B2 * | 1/2008 | Chang et al. | 717/168 |
| 7,344,074 | B2 * | 3/2008 | Markkanen | G06K 7/0008 235/435 |
| 7,376,583 | B1 * | 5/2008 | Rolf | G06Q 20/20 705/17 |
| 7,782,176 | B2 * | 8/2010 | Mitani | G06K 7/0008 340/10.6 |
| 7,789,313 | B2 * | 9/2010 | Degauque | G06K 7/0008 235/487 |
| 7,954,715 | B2 * | 6/2011 | Narendra et al. | 235/451 |
| 8,688,554 | B2 * | 4/2014 | Hammad et al. | 705/35 |
| 2002/0073025 | A1 * | 6/2002 | Tanner | G06Q 20/10 705/39 |
| 2003/0135382 | A1 * | 7/2003 | Marejka et al. | 705/1 |
| 2003/0189096 | A1 | 10/2003 | Markkanen et al. | |
| 2004/0019564 | A1 | 1/2004 | Goldthwaite et al. | |
| 2004/0194103 | A1 * | 9/2004 | Wang et al. | 718/100 |
| 2005/0017068 | A1 * | 1/2005 | Zalewski et al. | 235/380 |
| 2005/0108317 | A1 | 5/2005 | Someya et al. | |
| 2005/0180317 | A1 | 5/2005 | Someya Takahisa et al. | |
| 2005/0279826 | A1 * | 12/2005 | Merrien | G06Q 20/341 235/380 |
| 2006/0074698 | A1 | 4/2006 | Bishop et al. | |
| 2006/0279410 | A1 | 12/2006 | Mitani et al. | |
| 2007/0131761 | A1 * | 6/2007 | Smets et al. | 235/380 |
| 2007/0145135 | A1 * | 6/2007 | Jogand-Coulomb et al. | 235/451 |
| 2007/0156436 | A1 * | 7/2007 | Fisher et al. | 705/1 |
| 2008/0011833 | A1 * | 1/2008 | Saarisalo | G06Q 20/32 235/382 |
| 2008/0046100 | A1 * | 2/2008 | Balasubramanian | 700/17 |
| 2008/0116264 | A1 * | 5/2008 | Hammad et al. | 235/382 |
| 2008/0140667 | A1 * | 6/2008 | LaBiche | 707/10 |
| 2008/0162312 | A1 * | 7/2008 | Sklovsky | G06Q 20/32 705/35 |
| 2009/0075592 | A1 * | 3/2009 | Nystrom | G06K 19/0719 455/41.1 |

FOREIGN PATENT DOCUMENTS

| | | |
|---|---|---|
| WO | 2006095212 A | 9/2006 |
| WO | 2007068993 A | 6/2007 |

OTHER PUBLICATIONS

EMVCO, LLC, Copyright 2006, 1 page article, http://www.emvco.com/; website last visited Dec. 29, 2006.

Mary Catherine O'Connor, "Consumers Test NFC-enabled Mobile Phones Using EMV Protocol", RFiD Journal, Nov. 15, 2006, 4 page article, http://www.rfidjournal.com/article/view/2826, website last visited Dec. 29, 2006.

JAVA Community Process, "JSR 257: Contactless Communication API", 7 page article, http://jcp.org/en/jsr/detail?id=257, website last visited Dec. 29, 2006.

International Preliminary Report on Patentability issued in International Application No. PCT/US2007/086766, dated Jun. 30, 2009, 7 pages.

* cited by examiner

METHOD AND SYSTEM FOR MONITORING SECURE APPLICATION EXECUTION EVENTS DURING CONTACTLESS RFID/NFC COMMUNICATION

RELATED APPLICATIONS

U.S. Patent Application, filed Dec. 29, 2006, by Sklovsky et al., entitled "Method and system for Monitoring Secure Applet Events During Contactless RFID/NFC Communication", incorporated herein by reference in its entirety.

FIELD OF THE INVENTION

The present invention relates to mobile devices, and more particularly, to contactless transactions using a mobile device.

INTRODUCTION

The use of portable electronic devices and mobile communication devices has increased dramatically in recent years. Moreover, the demand for mobile devices that allow users to conduct contactless transactions is increasing. Near Field Communication technology (NFC) enables mobile devices to act as an electronic data transaction device. As one example, NFC can be used to perform contactless financial transactions such as those requiring a credit card. The user may select credit card information stored in the mobile device and perform contactless payments in a quick way by "tapping" or "waving" the mobile device in front of a contactless reader terminal. A reader terminal can read the credit card information and process a financial transaction. In practice, NFC can be coupled with a secure module (SM) to provide contactless payment transactions. The secure module can provide secure credit card information to the reader terminal using the NFC technology.

A contactless transaction ends when the credit card information, or other information, has been successfully read by the reader terminal. For example, the transaction ends successfully if the entire credit card information stored into the NFC-SM has been successfully read. However, during contactless payment transactions, it is not always guaranteed that a reader terminal will successfully read the credit card information. The contactless transaction may fail if only part of the credit card information has been read. It should also be noted, that once the reader has read the credit card information, an entity associated with the reader, such as a banking system, may accept or reject the contactless transaction. For instance, a banking system may reject the transaction if the balance of the account is insufficient for the payment even though the reading of the credit card information was technically successful. Whereas a banking transaction may fail when there is not enough money on the account, the mobile device transaction for providing the credit card information may succeed if the credit card information is read successfully.

Due to security restriction requirements, the mobile device is not authorized to evaluate secure transactions between the secure module and the reader terminal. That is, the mobile device is insulated from secure transactions occurring between the secure module and the reader terminal, even though the secure module is on the mobile device. Accordingly, a user of the mobile device may not have any means of knowing whether the credit card, or other secure data, was successfully read. In current NFC secure module technology, the mobile device can only monitor radio frequency (RF) events between the mobile device and the reader. To determine if a credit card has been successfully read, in the NFC-SM or in any other embedded secured module, the mobile device can analyze RF signals and determine what happened during the contactless transaction based only on an assessment of the RF signals. However, monitoring RF signals alone does not allow the mobile device to accurately inform the user of end of transaction events.

For example, referring to FIG. 1, a system of the prior art for NFC is shown. The system 100 can include a mobile device 110 and a reader terminal 170 for processing contactless transactions. The mobile device 110 can include an antenna for communicating passive or active RF signals within an RF field 150 of the reader terminal 170. In one arrangement, the reader terminal 170 may be a payment terminal for conducting financial transactions such as reading credit card information from the mobile device 110. The mobile device 110 can include an application processor 120 for providing a user interface for the contactless transactions, a NFC-SM (secure module) 130 that has secure execution environment, where secure application is executed and secure data processed according to secure algorithms. SM can inform the application processor 120 of secure transactions that provides secure credit card information to the reader terminal 170 via RFID/NFC communication, using modem 140

As per existing banking standards, virtual payment cards can be used with the NFC secure module to conduct the contactless payment transaction with the reader terminal 170. The virtual payment cards can be JavaCard applications or other smart card applications loaded and installed in the NFC-secure module 130. These contactless applications hold similar data as the one in a contact or contactless credit card, such as Cardholder information data, Cryptographic keys, and Cardholder authentication data (personal identification numbers, biometrics, etc). The payment applications may be JavaCard™ applets. For instance a bank or credit card agency may provide a card solution such as the Pay-Pass™ contactless payment applet. This JavaCard application is provided either by the bank or credit card agencies and installed in the NFC-SM 130.

In a contactless payment scenario, data exchange between the reader terminal (payment terminal) 170 and the NFC-SM 130 can be performed over-the-air using a NFC protocol. The NFC-SM 130 and modem 140 acts as a virtual contactless card and handles all external requests from the reader terminal 170 itself through the NFC modem 140 over communication link 3 (132). The communication link 3 (132) is defined by the Integrated Card (IC) manufacturers and may be any suitable protocol such as a Single Wire Protocol implementation or others. Any data exchange between the application processor 120 and the NFC-SM 130 is performed through the physical line link 1 (122). The communication link 122 may be one as defined in ISO 7816 standards. Any data exchange between the application processor 120 and the NFC modem 140 is done through the communication link 2 (160). The communication link 160 is typically involved during the NFC payment application initialization and termination phase to manage the NFC modem 140 resource. The communication link 160 is used to monitor RF events at the NFC modem side, and may be based on standard or proprietary protocols such as I²C, UART, USB, etc.

Due to security restrictions, the application processor 120 cannot access transaction information in the NFC-SM 130 during transaction process. In particular, as shown in FIG. 1, the application processor 120 can only receive relative RF field information (e.g. absence or presence of RF field) from NFC modem 140 over Link 2 160. Link 2 160 only provides for monitoring of RF events as sensed by the integrated circuits in 110. That is, the Link 2 does not provide any information as to whether the NFC-SM 130 successfully received data from the Reader 170, processed all data according to secure algorithms and send data back to the reader 170 successfully via the modem 140. In such regard, the application processor 120 cannot confirm whether the reader 170 completed the contactless transaction, nor monitor end of transaction events directly between the NFC-SM 130, NFC modem 140 and the reader 170. All data flow and transactions go through NFC-SM 130 and reader 170 via NFC modem 140, using links 132 and 150. Only RF events in the RF field 150 can be monitored by the application processor 120. Monitoring RF events in the RF field 150 does not provide a true indication of an end of transaction event due to peculiarities of movement between the mobile device and the reader terminal.

As an example, variations in RF field 150 strength as a result of intensity changes in the neighborhood of the reader terminal 170 can produce false end of transactions. For example, the user may move the mobile device 110 too rapidly in the RF field 150, or insufficiently close to the reader terminal 170. The RF field might be cut off due to weak signal strength, signal degradations, improper distance from the reader. In such cases, the transaction protocol between reader and mobile would be terminated before completion. The RF events cannot be reliably monitored through RF field detection. Moreover, the RF field 150 can be payment terminal-dependent such that the end of transaction notification on the mobile device 110 may vary from one terminal to another. Some terminals may not switch off their RF field 150 at the end of the transaction.

SUMMARY

Broadly stated, embodiments of the invention are directed to a system and method for monitoring secure application execution events in a mobile device during contactless RFID/NFC communication. One embodiment is directed to a system for monitoring secure contactless transaction suitable for use in a mobile device. The system can include a Near Field Communication (NFC) modem for providing NFC communication (e.g. low-level contactless communication) with a NFC reader, a secure controller (SC) for secure applications execution and secure data processing, SC can monitor state transitions caused by the transaction events and generate a messaging mechanism via hardware, and a mobile host communicatively coupled to the secure controller, the mobile host being capable of receiving event notifications via hardware interrupt mechanisms. The secure controller can generate a message (e.g. hardware interrupt) for indicating a completion of data transaction or any other required to monitor events during secure application execution. The messaging can be done in two ways. The first method is to generate the interrupt to mobile host. Secure application sets up the status bits flag (for instance, TCF, transaction completion flag) into the dedicated Events Status Register (ESR) upon execution of the required event, based on applet States Transition. The ESR can identify a status of a secure contactless transaction. Upon setting the TCF, SC generates INT to mobile host. The hardware interrupt can also signal a timeout for an event completion. The second method is to send special message to mobile host upon a change in ESR.

One embodiment is directed to a method for secure contactless transaction. The method can include monitoring state transitions of an applet during a secure contactless transaction, detecting applet state transitions caused by the event executions, and notifying of the application state transitions upon an event occurrence by a hardware messaging mechanism. The method can include generating a (hardware) interrupt by setting a flag in an events status register (ESR) of a mailbox upon detecting the last state transition. The hardware interrupt can also be generated in response to a timeout. The method can include providing access to the ESR at any time in order to read events out of a protected memory when an application is conducting secure contactless transactions.

Another embodiment is directed to an electronic wallet for secure contactless transactions. The electronic wallet can include a NFC/RFID modem for sending and receiving RF signals of a secure contactless transaction, a secure controller communicatively coupled to the NFC/RFID modem for identifying events associated with the secure contactless transaction based on a hardware mechanism, and a mobile host for receiving a status of the events from the secure controller, the mobile host presenting the status and the events through a user interface. The secure controller can notify the mobile host of secure contactless transactions in view of state transitions, and the mobile host can display information associated with the secure contactless transaction.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

Figure 1:
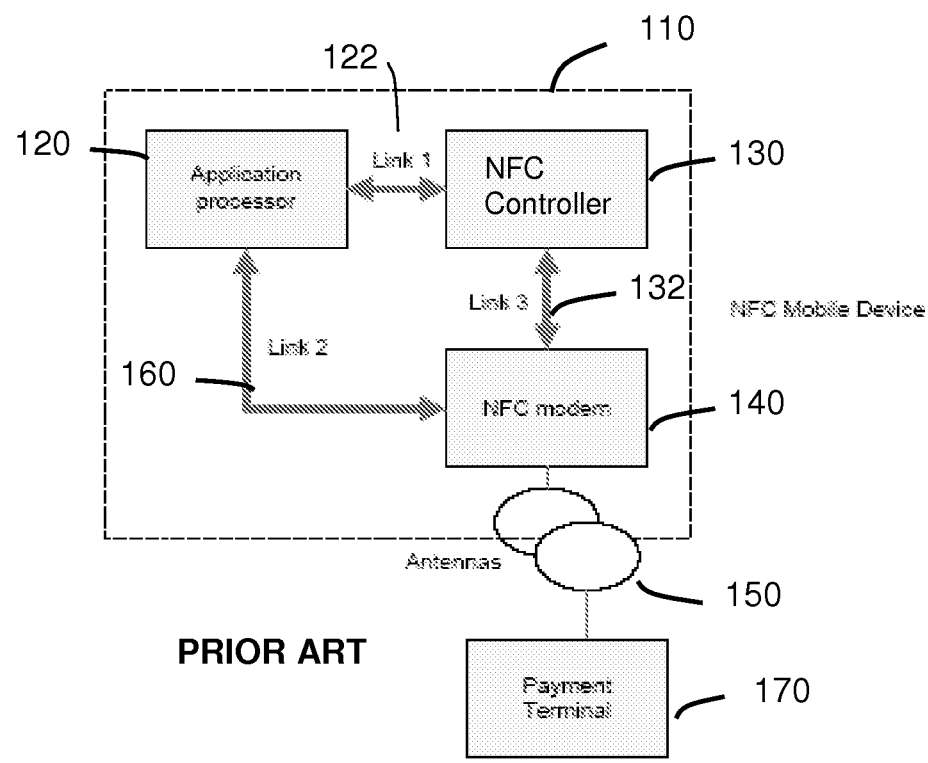
FIG. 1 is a Near Field Communication (NFC) Controller of the prior art for secure contactless transactions in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The term "transaction event" can be defined as an event occurring between a NFC modem and a NFC reader, the event occurring through radio frequency communication. The term "applet event" can be defined as an event occurring on a secure controller that is associated with a state transition, causing a transaction event. The term "state transition" can be defined as a change in state of an applet that is running on a secure controller. The term "application" can be defined as a process running on a mobile host. The term "mobile host" can be defined as a processor or a mobile device. The term "messaging mechanism" can be defined as hardware or software that provides an exchange of data. The term "completed transaction" can be defined as one stage of completion of a secure contactless transaction, or as a final completion of the secure contactless transaction. The term "events execution" can be defined as the execution of transaction events or applet events.

Broadly stated, embodiments of the invention are directed to reliable monitoring of execution events. In one arrangement, the host, which does not have direct access to secure controller (TD, SC, SM) events during secure application execution, can be informed of the events via a messaging mechanism (that uses hardware interrupts as a one option). The hardware implementation is provided as a messaging mechanism. Secure controller includes a mail-box which is accessible any time from either the mobile host or the secure controller. In one arrangement the hardware implementation is based on an interrupt request that is generated in response to a transaction event. The hardware interrupt can be generated, for instance, by signaling a transaction completion flag (TCF) in an events status register (ESR). The mobile host can then read the value of the TCF and determine whether or not the transaction completed. In another arrangement, messages can be delivered to the host after all data processing and data transaction has been completed with the NFC Reader. After receiving the message, upon the completion of data transaction, the mobile host can access an event status or data associated with the status. The mobile host can then make a decision regarding the occurred event.

The completion of data transaction can be based on the event and applet state transition, such as a completion of the required secure transaction processing in accordance with algorithms and procedures of the particular contactless payment application, and sending of a last command to NFC transceiver and external Reader. Messaging between the mobile host and the secure controller can be performed via hardware interrupts. For example, the data manager sets up ESR flag and can be connected to a GPIO which can generate an interrupt request (IRQ INT) to the mobile Host CPU, signaling that the event occurred or transaction completed, or timed out. The mobile host can access the shared data in order to read the ESR.

Figure 2:
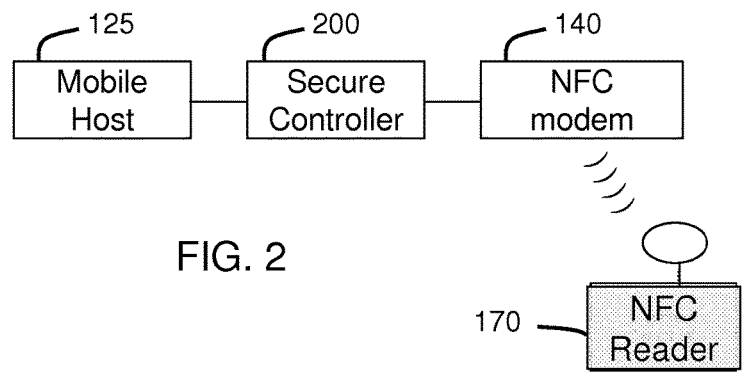
FIG. 2 is a general block diagram for a NFC/RFID secure contactless transaction system in accordance with the embodiments of the invention.

Referring to FIG. 2, a block diagram for a NFC/SIM contactless transaction system 111 is shown. The system 111 can include a Near Field Communication (NFC) modem 140 for communicating transaction events of a secure contactless transaction with a NFC reader 170, a secure controller (SM) 200 communicatively coupled to the NCF modem 140 for reliable monitoring of secure applet events, and a mobile host 125 communicatively coupled to the SM 200 for receiving event notifications associated with the state transitions. The mobile host 125 may be an application processor or any other processor and can present a user interface to display the event notifications. As one example, an applet can reside and execute in the secure controller 200 and communicate with the NFC reader 170 via the NFC modem 140. The NFC modem 140 is essentially an RF front-end passing signals between the terminal 170 and NFC-SM 130. The Java messaging Application Programming Interface (API) for conveying data between the mobile host 125 and secure controller 200 can be used for messaging and events monitoring.

In one arrangement, the mobile host 125, secure controller 200, and NFC modem 140 may be integrated in a mobile device such as a cell phone. The mobile device may also be a portable music player, a personal digital assistant, a mobile data storage unit, a personal security device or any other suitable electronic or communication device. The mobile host 125 can be an application processor that exposes a user interface to a user of the mobile device, or any other processor. The user interface can present event notification associated with a secure contactless transaction. Notably, the mobile host 125 has access to the mobile device's computing and user interface resources, such as the display, audio features, memory and processor. The mobile host 125 can provide information through the user interface to expose to the user events associated with the secure contactless transaction. As one example, the NFC/SIM contactless transaction system 111 can conduct financial transactions which can include reading credit card information from a secure module in the mobile device.

Contactless upper layers of applications can run on the mobile host 125, the secure contactless low layers applets run on secure controller 200. The secure controller 200 can inform upper layers of applications on the mobile host 125 of events or status during the secure contactless transactions. In one arrangement, the secure controller 200 can expose an Applications Programming Interface (API) which allows applications to access the events and status. In particular, the secure controller 200 provides a software and hardware implementation for exposing features of the API. The hardware consists of a data manager having a mailbox and a secure protected memory. The mailbox can include an events status register and data registers for identifying an occurrence of events and for storing event information, respectively. For example, an application can sign up for notification events from the mobile host 125 through the secure controller 200. The secure controller 200 can inform the mobile host 125 of transaction events, which can in turn be presented to a listener implementing the API. As an example, the NFC/SIM contactless transaction system 111 can be used for applications such as ticketing, access control, loyalty programs, that can be hosted by contactless applications on the mobile device.

The mobile host 125 can receive status and event notifications from the secure controller 200 regarding events of a secure contactless transaction. The secure module can be a SIM based on GSM, or a USIM based on UMTS, or SD card. The secure controller 200 can identify state transitions of applications and transaction protocols between the NFC modem 140 and the NFC reader 170, and determine events associated with the state transitions. As an example, a state transition can be a request to make a payment, enable a payment, or cancel a payment. The secure controller can monitor the state transactions and send event notifications to the mobile host 125.

Figure 3:
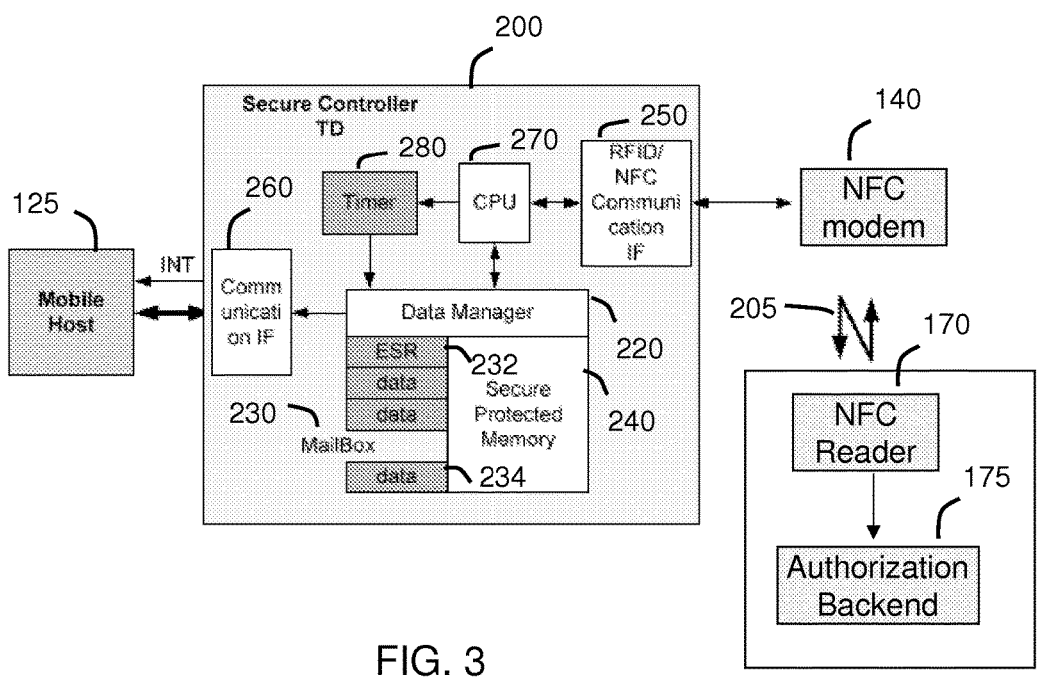
FIG. 3 is a more detailed block diagram of the secure controller for the NFC/RFID secure contactless transaction system of FIG. 2 in accordance with the embodiments of the invention.

Referring to FIG. 3, a more detailed block diagram of the secure controller for the NFC/RFID secure contactless transaction system of FIG. 2 is shown. All components can be in hardware (HW) besides the data manager 220 and ESR 232. The secure controller 200, can include CPU 270 for applications execution and data processing, a RFID/NFC communication interface 250 to the NFC modem for sending and receiving transaction data, a data manager 220 for control access to secure protected memory 232, memory mailbox 230 and handling event notifications, and a communication interface (CIF) 260 operatively coupled to the mobile host 125 for communication link between mobile host and secure controller and sending messages to the mobile host regarding event notifications. The secure controller 200 can also include a timer 280 communicatively coupled to the CPU 270 and data manager 220 for generating timeout signal to data manager, resulting in messages to the mobile host in case of any failure events.

Secure controller memory includes the secure protected memory 240, data manager 220, a mailbox 230 for messaging exchange between mobile host and secure controller during secure application execution. The mailbox 230 can include an events status register (ESR) 232 for specifying various flags associated with monitored transaction events and a status of the events, and at least one data register 234 indexed by the ESR for identifying a transaction event parameter in the secure protected memory. In one arrangement, mobile host sends request for specific event monitoring to ESR via CIF 260 and Data manager 220. Upon application execution and the event occurrence, data manager 220 updates ESR and corresponding data registers EDR 234, and sends request to CIF for messaging to mobile host. Receiving the message from SC 200 (through INT or message), mobile host can access the mailbox registers ESR 232 and EDR 234 in order to read the data in secure protected memory 240, even during execution of secure application by CPU 270, without termination and any timing violation. As one example, the data manager 220 can set up a Transaction Complete Flag (TCF) in the ESR to indicate a completion of a secure contactless transaction.

Figure 4:
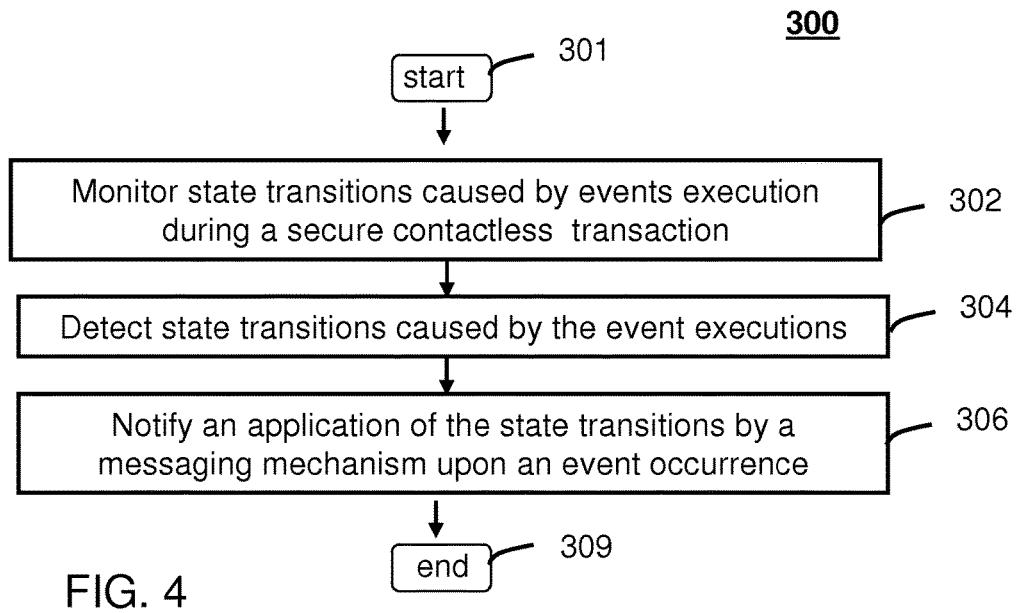
FIG. 4 is a method for detecting a completion of secure contactless transaction in accordance with the embodiments of the invention.

Referring to FIG. 4, a method 300 for detecting a completion of secure contactless transaction is shown. Briefly, the method 300 is directed to reliably monitoring secure application execution events based on state transitions. The method 300 can be practiced with more or less than the number of steps shown. To describe the method 300, reference will be made to FIG. 3 although it is understood that the method 300 can be implemented in any other manner using other suitable components. In addition, the method 300 can contain a greater or a fewer number of steps than those shown in FIG. 4.

At step 301, the method 300 can start. At step 302, state transitions caused by events execution can be monitored. For example, applet state transitions are generated in response to secure contactless transactions between an NFC modem and a NFC reader. As one example, a transition event can be a change of RF signals, which signifies a change in events. A state transition can be a change of a state in an applet. With regard to an application, a state transition may identify request to make a payment, confirm a payment, or cancel a payment.

At step 304, applet state transitions caused by the event executions can be detected. For example, referring to FIG. 3, the secure controller 200 can determine when the NFC modem 140 sends a command 205 to the NFC reader 170 by monitoring state transitions. The secure controller data manager 220 can identify the applet's state transition and last instructions, which corresponds to the event of sending the last data packet to the reader 170 via NFC modem 140. The timer 280 can also inform the secure controller 200 of the timing between state transitions of the start transaction and expected completion in order to generate the event of transaction completion. In one aspect, the data manager 220 can set a flag in the event status register (ESR) 260 in response to detecting a state transition.

At step 306, an application can be notified of the applet state transitions by a messaging mechanism upon an event occurrence. For example, the mobile host can be notified of secure contactless transaction based on the secure controller 200 identifying an event execution. Referring to FIG. 3, the mobile host 125 can receive an event notification via a message from the data manager 220 through the CIF 260. The CIF 260 can send a message to the mobile host 125 to inform the mobile host 125 of events. This allows the mobile host to present a status of the secure contactless transaction to a user through a user interface. For example, the mobile host can visually present steps of the secure contactless transaction as they occur. For instance, a message can be displayed informing the user that a credit card payment has been initiated, the credit card payment is being authorized, or a confirmation that the credit card transaction has been processed. The event notification also allows the mobile host to present additional data associated with the transaction, such as a card association logo or merchant name. At step 309, the method 300 can end.

Figure 5:
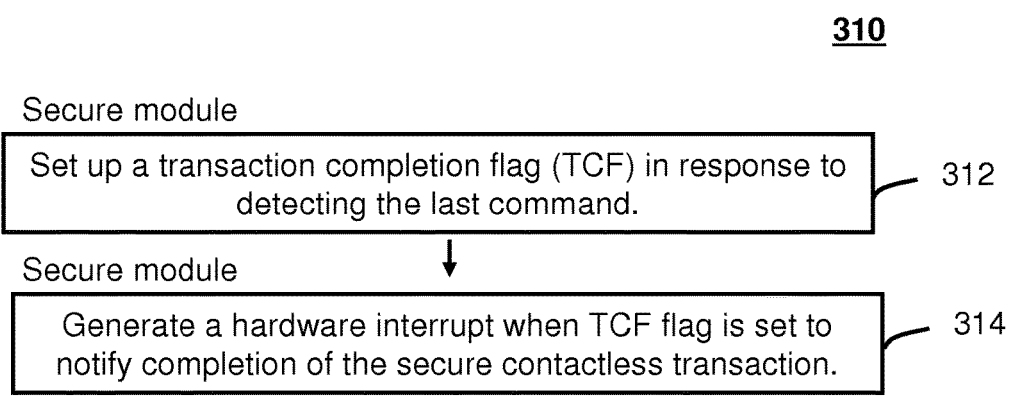
FIG. 5 is a method for implementing a software or hardware transaction complete flag (TCF) in accordance with the embodiments of the invention.

Briefly referring to FIG. 5, one exemplary implementation 310 for the method step 304 of FIG. 4 is shown. In particular, the implementation 310 is directed to introducing a transaction complete flag (TCF) for signaling a completion of a transaction event. It should be noted that the implementation 310 provides the underlying hardware and software for a TCF. That is, the implementation 310 provides a native implementation of the method 300 for identifying a completion of secure contactless transaction.

At step 312, the secure controller 200 can set up a transaction completion flag (TCF) in response to detecting the applet's command. In practice, the secure controller 200 can generate the TCF in response to state transitions caused by event execution between the secure controller via NFC modem 140 and the NFC reader 170. For example, as shown in FIG. 5, the secure controller 200 can identify a command 205 sent to the NFC reader 170. The secure controller 200 can then set up the software-based TCF in the ESR 232. The TCF is used to indicate a status of the transaction. As an example, the status can indicate progress of the secure contactless transaction or a completion of the secure contactless transaction. The secure controller 200 can notify the mobile host 125 by sending a message to the mobile host 125. After receiving the message from secure controller 200 through the CIF 260, the mobile host 125 can then read the value of the TCF in the ESR 232 and determine a status of the transaction.

In the case of a contactless application, the TCF would normally be reset to NOT_COMPLETE at the start of every transaction. The secure controller 200, or an application running on the mobile host 125 receiving messages through the CIF 260, can monitor state transitions caused by event execution between the NFC controller 200 and the NFC reader 170. As one example, the application can monitor the state transitions through event notifications sent from the secure controller 200 to the mobile host 125 according a prescribed protocol of a particular payment transaction. When the data exchange has been performed, the secure controller 200 can set the value of the TCF to COMPLETE. Eventually, the secure controller 200 can send a message to the mobile host 125.

At step 314, the secure controller 200 can generate a hardware interrupt when TCF flag is set to notify a status of the secure contactless transaction. For example, the setting of the TCF flag in the ESR 232 can generate an interrupt. In response to the interrupt, the mobile host 125 can send an appropriate command to the CIF 260 to read the TCF from the ESR 232. That is, mobile host 125 can check the status of a contactless transaction by accessing the events status register ESR and ERB in the mailbox 230. In such regard, the mobile host 125 proactively inquires the data manager 220 as to event status. For example, the mobile host 125 can access the ESR 232 for changes in the TCF.

If the TCF is set to COMPLETE, the secure contactless transaction is considered complete, and the mobile host 125 can present status and event notifications to the user interface. For example, the mobile host 120 can indicate a payment application's branding information or logo to the user. It should also be noted that the interrupt can be timer driven. For example, the Timer 280 can determine if a timeout occurs, and the secure controller 200 can notify the mobile host 125 of the time out. This can allow the mobile host to display information, such as a wait status, or an in-progress timer to the user.

In one embodiment, referring to FIG. 2, the secure controller 200 can detect a last command sent to the NFC modem 170, set up a transaction completion flag (TCF) upon identifying the last command, and inform the mobile host of a completion of the contactless transaction.

Figure 6:
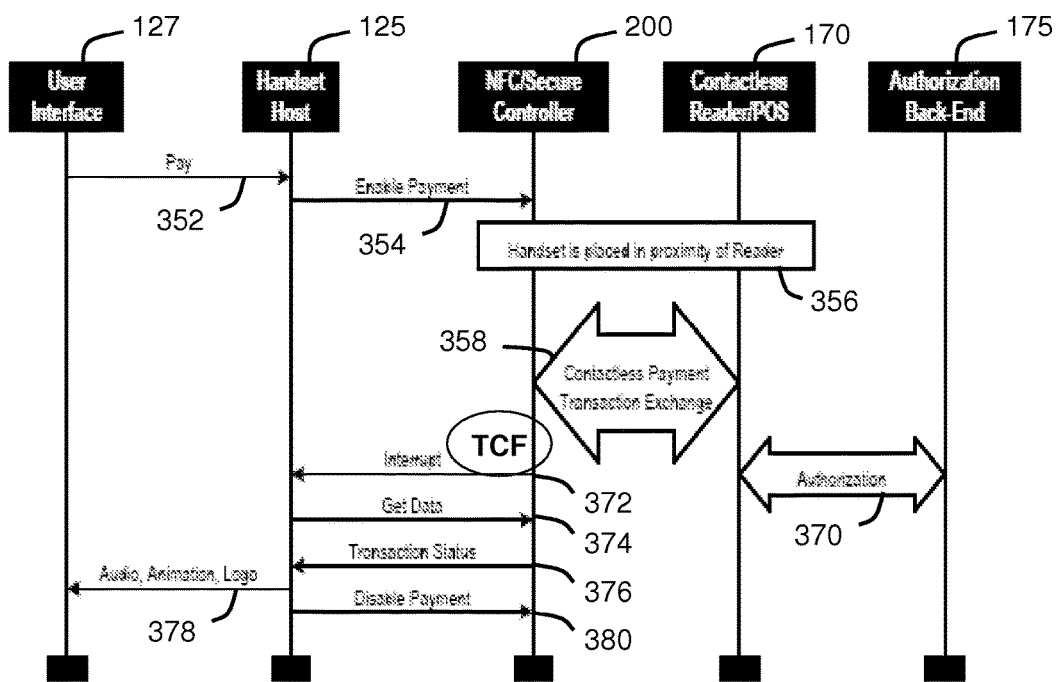
FIG. 6 is a flow chart for NFC/RFID contactless transaction based on state transitions in accordance with the embodiments of the invention.

Referring to FIG. 6, a flowchart for conducting NFC/RFID contactless transaction based on state transitions is shown. Briefly, the flowchart 350 includes the Transaction Complete Flag (TCF) as an interrupt mechanism 372 to indicate a status of a secure contactless transaction. The flowchart identifies the commands and transactions associated with a NFC/RFID contactless payment.

A reliable monitoring of secure applet events is based on the applet states transitions, caused by the events execution. A secure applet notifies the host upon the event occurrence by messaging mechanism. This allows an application running on the host to receive status information with respect to secure contactless transaction events. The secure controller 200 provides a hardware messaging interface that allows the mobile host to access data and events associated with secure applet execution. For example, the secure controller 200 can save data within a shared protected memory 240 during secure transactions. The mobile device can also access the data during the secure transaction. Notably, this allows an application on a host to receive event notifications during secure transactions. Prior art systems cannot provide the data until the transaction is complete; transaction events may be received only after all data processing and data transaction have been completed by the NFC Reader 170: the mobile device has to identify an operating state without exact knowledge; for instance, based on a guaranteed time interval, which usually exceeds significantly the real time transaction due to large differences of execution transactions. The proposed secure controller 200 provides the mobile device access to applet data to read the status of required events immediately after they have occurred, such as the completion of data transaction event, or any other. The completion of a data transaction can be indicated based on the completion of required secure processing algorithms, protocol, and sending the commands to NFC transceiver and external Reader 170. Notably, the application sets up a software-based Transaction Completion Flag (TCF) into Events Status register (ESR).

At step 352, a user can initiate a secure contactless transaction. For example, the mobile host 125 can expose a user interface 125 which allows the user to perform a contactless payment. At step 354, the mobile host 125 can send an enable payment command to the secure controller 200. At step 356, the NFC reader 170 can detect that the user has placed the handset in front of the NFC reader 170. At step 358, the secure controller 200 and the NFC reader 170 can exchange transactions. The transactions can include the exchange of credit card information, account information, or any other information associated with the transaction for making a payment. In one arrangement, at step 370, the NFC reader 170 can authenticate the payment.

During the exchange, the secure controller 200 can monitor state transitions in the applet that are associated with an execution of transaction events between the NFC modem 140 and the NFC reader 170. In one aspect, the secure controller 200 can determine when a command is sent to the NFC reader 170, or when an execution event causes a state transition. In response to a specific state transition, the secure controller 200 can set the TCF in the ESR 232 of the mailbox 230. This action can generate an interrupt, which at step 372, can inform the mobile host 125 of an event notification. In such regard, the TCF identifies a status of a transaction event, wherein the status may indicate a progress or a completion of a secure contactless transaction.

At step 374, the mobile host 125 can retrieve data associated with the end of transaction. The data is available in the from the shared protected memory 240. The data may be a confirmation receipt or additional information such as an electronic coupon, At step 376, the secure controller 200 can inform the mobile host 125 of the completed transaction status. At step 378, the mobile host 125 can present an audio, animation, or logo through the user interface 127 to the user, to inform the user of the completed transaction. Notably, the mobile host 125 can inform the user interface of all transactions processed by the secure controller 200 and made available to the mobile host 125. At step 380, the mobile host 125 can disable payment application as completed application execution event Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A system for reliable monitoring of secure applet events, the system incorporated in a mobile device, the system comprising:
   a Near Field Communication (NFC) modem operable to communicate with an NFC reader, the NFC modem communicating information associated with transaction events;
   a secure controller coupled to the NFC modem configured to run an applet, the secure controller including a central processing unit and a messaging mechanism, the secure controller programmed to provide secure application execution and secure data processing, monitor applet state transitions caused by the transaction events, and generate notifications of the applet state transitions and statuses of the transaction events responsive to the applet state transitions associated with the transaction events; and
   a mobile host processor coupled to the secure controller, the mobile host processor programmed to receive the notifications of the applet state transitions associated with the transaction events and display the status of the transaction events through a display of the mobile device,
   wherein the applet state transitions comprise one or more of:
      a request to make a payment;
      an enablement of the payment;
      a cancellation of the payment;
      a confirmation of the payment; and
      a completion of a transaction,
   wherein the secure controller generates a hardware interrupt or a message for indicating a completion of data transaction and the secure controller is further programmed to respond to a timer timeout to generate a hardware interrupt signal for an event completion.

2. The system of claim 1, wherein the secure controller sets up a Transaction Completion Flag (TCF) or any other flags of Events into an Events Status Register (ESR) to identify a status of a secure contactless transaction.

3. The system of claim 1, wherein the secure controller includes:
   a RFID/NFC communication interface to the NFC modem for communicating transaction events between the mobile host processor and the secure controller;
   a data manager comprising a secure memory operatively coupled to the RFID/NFC communication interface for signaling transaction event occurrences and handling transaction event data for control access to a secure protected memory; and
   a communication interface (CIF) operatively coupled to the data manager for conveying messages to the mobile host processor in response to transaction event occurrences.

4. The system of claim 3, wherein the secure controller includes:
   the timer communicatively coupled to the data manager for identifying transaction event times, wherein the data manager is operable to generate timeout signal messages to the mobile host processor in case of any event failures to notify the mobile host processor on an occurred transaction.

5. The system of claim 4, wherein the data manager includes a secure protected memory for storing data and transaction events communicated between the NFC modem and the NFC reader, and wherein the data manager is operable to provide a mailbox for messaging exchange between the mobile host processor and the secure controller during secure applications execution.

6. The system of claim 5, wherein the mailbox includes:
   an events status register (ESR) for specifying a number of transaction event parameters and a status of the transaction events.

7. The system of claim 5, wherein the mailbox includes:
   at least one data register for identifying data and transaction events in the secure protected memory.

* * * * *